United States Patent
Gao et al.

(10) Patent No.: US 12,069,644 B2
(45) Date of Patent: Aug. 20, 2024

(54) METHOD FOR TRANSMITTING DATA, BASE STATION, TERMINAL, SYSTEM, AND COMPUTER READABLE STORAGE MEDIUM FOR ACCELERATING RESCHEDULING OF RESOURCES

(71) Applicant: ZTE Corporation, Shenzhen (CN)

(72) Inventors: Minggang Gao, Shenzhen (CN); Qingyu Ni, Shenzhen (CN); Xuemei Ding, Shenzhen (CN); Mingye Wei, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 217 days.

(21) Appl. No.: 17/604,797

(22) PCT Filed: Sep. 28, 2020

(86) PCT No.: PCT/CN2020/118284
§ 371 (c)(1),
(2) Date: Oct. 19, 2021

(87) PCT Pub. No.: WO2021/063299
PCT Pub. Date: Apr. 8, 2021

(65) Prior Publication Data
US 2022/0240279 A1 Jul. 28, 2022

(30) Foreign Application Priority Data
Sep. 30, 2019 (CN) .......................... 201910945891.0

(51) Int. Cl.
*H04W 72/12* (2023.01)
*H04L 1/08* (2006.01)
(Continued)

(52) U.S. Cl.
CPC ........... *H04W 72/1263* (2013.01); *H04L 1/08* (2013.01); *H04L 5/0053* (2013.01); *H04W 72/23* (2023.01)

(58) Field of Classification Search
CPC ............. H04W 72/1263; H04W 72/23; H04W 72/1273; H04W 72/21; H04L 1/08;
(Continued)

(56) References Cited

U.S. PATENT DOCUMENTS

2009/0285160 A1* 11/2009 Cheng .................. H04L 1/1896
370/328
2010/0111107 A1* 5/2010 Han ...................... H04L 5/0091
370/472
(Continued)

FOREIGN PATENT DOCUMENTS

| CN | 101399651 A | 4/2009 |
| CN | 107483160 A | 12/2017 |

(Continued)

OTHER PUBLICATIONS

Ericsson., "Summary for WI Shortened TTI and Processing Time for LTE", 3GPP TSG RAN meeting #78 RP-181008, Jun. 14, 2018.
(Continued)

*Primary Examiner* — Kiet Tang
(74) *Attorney, Agent, or Firm* — CANTOR COLBURN LLP

(57) ABSTRACT

The embodiments of the present disclosure provide a method for transmitting data, a base station, a terminal, a system, and a computer-readable storage medium. In the method for transmitting data, a base station sends control information to a terminal over a PDCCH, starts to receive a feedback signal which is sent by the terminal after decoding the control information, and sends information to the terminal after receiving the feedback signal.

19 Claims, 7 Drawing Sheets

(51) Int. Cl.
  *H04L 5/00*       (2006.01)
  *H04W 72/1263*    (2023.01)
  *H04W 72/23*      (2023.01)

(58) Field of Classification Search
  CPC ... H04L 5/0053; H04L 1/1854; H04L 1/1864;
       H04L 1/1887; H04L 5/0055; H04L 1/201
  See application file for complete search history.

(56) References Cited

U.S. PATENT DOCUMENTS

| | | | |
|---|---|---|---|
| 2017/0171841 A1 | 6/2017 | Chen | |
| 2017/0353273 A1 | 12/2017 | Zhang | |
| 2018/0176922 A1* | 6/2018 | Li | H04W 72/541 |
| 2019/0110290 A1* | 4/2019 | Sun | H04W 24/08 |

FOREIGN PATENT DOCUMENTS

| | | | |
|---|---|---|---|
| CN | 108462997 A | 8/2018 |
| CN | 109963326 A | 7/2019 |

OTHER PUBLICATIONS

International Search Report for corresponding application PCT/CN2020/118284 filed Sep. 28, 2020; Mail date Dec. 31, 2020.
European Search Report for corresponding application EP20872680; Report dated Jun. 3, 2022.

* cited by examiner

METHOD FOR TRANSMITTING DATA, BASE STATION, TERMINAL, SYSTEM, AND COMPUTER READABLE STORAGE MEDIUM FOR ACCELERATING RESCHEDULING OF RESOURCES

CROSS REFERENCE

This application is a National Stage Filing of the PCT International Application No. PCT/CN2020/118284 filed on Sep. 28, 2020, which claims priority to Chinese Application No. 201910945891.0 filed on Sep. 30, 3019, the entirety of which is herein incorporated by reference.

TECHNICAL FIELD

The embodiments of the present disclosure relate to, but are not limited to, the field of communication technologies.

BACKGROUND

With the rapid development of communication technologies, a mobile communication network has been developed to a 5G network. Three types of services, i.e., an enhanced Mobile Broad Band (eMBB), a massive Machine Type Communication (mMTC), and an Ultra Reliable Low Latency Communication (URLLC), are provided in the 5G network. In the related art, during a communication establishment procedure, the network side needs to wait for the terminal to decode control information sent over a control channel, receive and decode data information, and send a feedback signal, before the network side can reschedule control information resources, which results in large time delay, relatively low speed and low efficiency in the communication establishment procedure.

SUMMARY

Some embodiments of the present disclosure provide a method for transmitting data, including: sending control information to a terminal over a Physical Downlink Control Channel (PDCCH); starting to receive a feedback signal which is sent by the terminal after decoding the control information; and sending information to the terminal in responsive to receiving the feedback signal.

Some embodiments of the present disclosure provide a method for transmitting data, including: in responsive to receiving control information sent by a base station over a PDCCH, decoding the control information; and sending a feedback signal to the base station after decoding the control information.

Some embodiments of the present disclosure provide a base station, including: a detection module, a starting module, a sending module and a receiving module, wherein the detection module is configured to detect error Physical Downlink Shared Channel (PDSCH) packets reported by a terminal and an application scenario of the terminal; the starting module is configured to start to receive a feedback signal which is sent by the terminal after decoding control information; the sending module is configured to send the control information to the terminal over a PDCCH in a case where the number of the error PDSCH packets reported by the terminal exceeds a preset threshold, and send information to the terminal according to the feedback signal; and the receiving module is configured to receive the feedback signal which is sent by the terminal.

Some embodiments of the present disclosure provide a terminal, including: a receiving module, a decoding module and a sending module, wherein the receiving module is configured to receive control information sent by a base station over a PDCCH; the decoding module is configured to decode the control information; and the sending module is configured to send a feedback signal to the base station after the decoding module decodes the control information.

Some embodiments of the present disclosure provide a base station, including: a processor, a memory, and a communication bus. The communication bus is configured to implement connection and communication between the processor and the memory. The processor is configured to execute one or more computer programs stored in the memory, so as to implement the method for transmitting data described in the embodiments of the present disclosure.

Some embodiments of the present disclosure provide a terminal, including: a processor, a memory, and a communication bus. The communication bus is configured to implement connection and communication between the processor and the memory. The processor is configured to execute one or more computer programs stored in the memory, so as to implement the method for transmitting data described in the embodiments of the present disclosure.

Some embodiments of the present disclosure provide a method for transmitting data, including: sending, by a base station, control information to a terminal over a PDCCH; decoding, by the terminal, the control information, and sending, by the terminal, a feedback signal to the base station after decoding the control information; and sending, by the base station, information to the terminal according to the feedback signal.

Some embodiments of the present disclosure provide a communication system, including: a base station and a terminal. The base station includes the base station as described above. The terminal includes: a receiving module, a decoding module and a sending module, wherein the receiving module is configured to receive control information sent by a base station over a PDCCH; the decoding module is configured to decode the control information; and the sending module is configured to send a feedback signal to the base station after the decoding module decodes the control information.

Some embodiments of the present disclosure provide a computer-readable storage medium. The computer-readable storage medium stores one or more computer programs. The one or more computer programs, when being executed by one or more processors, cause the processor to implement the method for transmitting data described in the embodiments of the present disclosure.

Some embodiments of the present disclosure provide a computer-readable storage medium. The computer-readable storage medium stores one or more programs. The one or more programs, when being executed by one or more processors, cause the processor to implement the method for transmitting data described in the embodiments of the present disclosure.

DETAILED DESCRIPTION

To make the object, technical solution and advantages of the present disclosure clearer, the embodiments of the present disclosure are further described in details below with reference to embodiments and the accompanying drawings. It should be understood that the embodiments described herein are only intended to explain the present disclosure, but not to limit the present disclosure.

Figure 1:
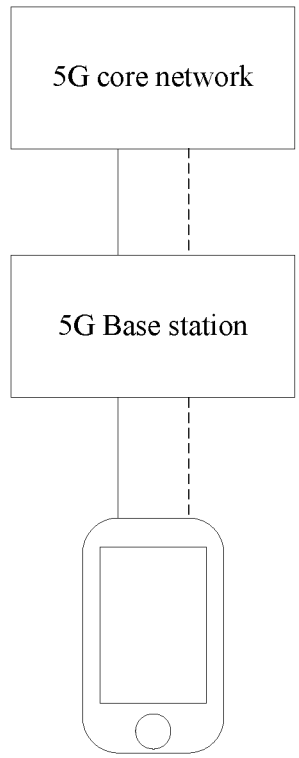
FIG. 1 is a schematic diagram of network construction according to some embodiments of the present disclosure.
Figure 2:
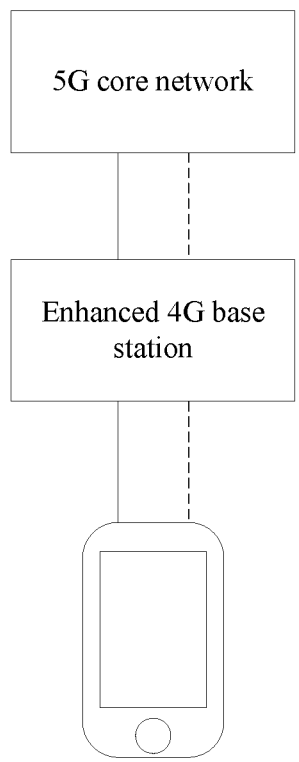
FIG. 2 is a schematic diagram of another network construction according to some embodiments of the present disclosure.

In order to realize data interaction between a base station and a terminal in various embodiments of the present disclosure, two types of 5G StandAlone (5GSA) are provided below. Refer to FIG. 1, the entire network consists of a 5G core network, a 5G base station, a direct transmission link, a backhaul link and a terminal. The 5G base station and the terminal realize data interaction via the direct transmission link. The 5G base station and the 5G core network realize data interaction via the backhaul link. Another 5GSA is also provided. Refer to FIG. 2, the whole network consists of a 5G core network, an enhanced 4G base station, a direct transmission link, a backhaul link and a terminal. The enhanced 4G base station and the 5G core network realize data interaction via the backhaul link. The enhanced 4G base station and the terminal realize data interaction via the direct transmission link.

In order to solve the problems of low speed in rescheduling resources and having a time delay caused by the fact that the network side needs to wait for the terminal to decode control information sent over a control channel, receive and decode data information, and send a feedback signal, before the network side can reschedule control information resources, the embodiments of the present disclosure provide a method for transmitting data, and the method for transmitting data proposed in the present disclosure is described below with reference to embodiments.

Figure 3:
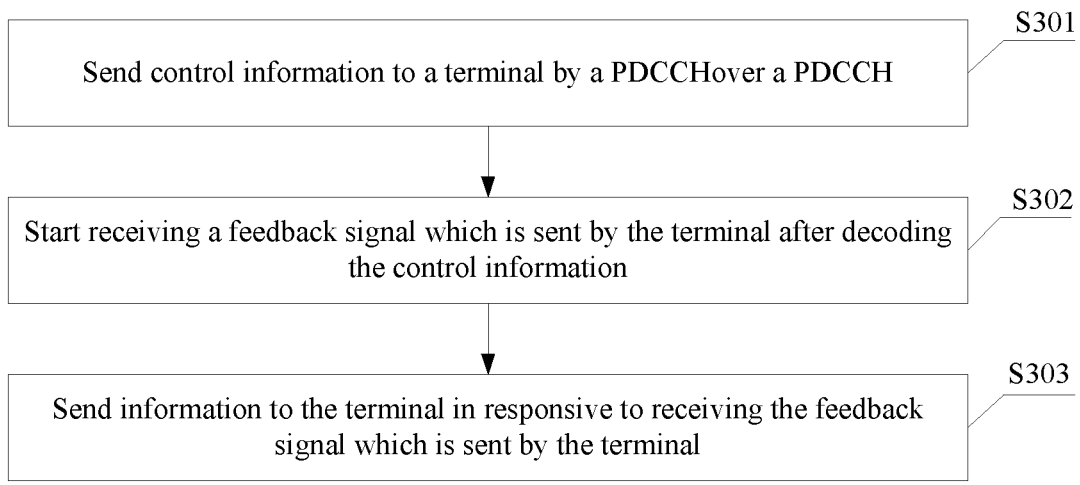
FIG. 3 is a basic flowchart of a method for transmitting data according to some embodiments of the present disclosure.

Please refer to FIG. 3, FIG. 3 is a basic flowchart of a method for transmitting data according to some embodiments of the present disclosure. The method for transmitting data includes operations S301 to S303 as follows.

In operation S301, control information is sent to a terminal over a PDCCH.

In the embodiments, the base station may be a 5G base station or an enhanced 4G base station, and the base station sends control information to the terminal over the PDCCH.

In the embodiments, before the control information is sent to the terminal over the PDCCH, the method may further include at least one of the following: in responsive to detecting that the number of error PDSCH packets reported by the terminal exceeds a preset threshold, sending the control information to the terminal over the PDCCH; and in responsive to detecting that an application scenario of the terminal is a preset application scenario, sending the control information to the terminal over the PDCCH. The application scenario of the terminal includes intelligent driving, unmanned driving, intelligent medical treatment, industrial control robot, aerospace control, etc.

In operation S302, receiving of a feedback signal which is sent by the terminal after decoding the control information is started.

In the embodiments, the base station starts to receive the feedback signal which is sent by the terminal after decoding the control information.

Before the current operation, it is possible that the base station sends control information to the terminal over the PDCCH, the base station sends data information to the terminal over a PDSCH, receives a signal indicative of a decoding result of the data information and sent by the terminal over the PDSCH, and according to the unsuccessful decoding result or no feedback being received, the base station resends the control information to the terminal, for example, the base station resends the control information to the terminal over the PDCCH.

In operation S303, information is sent to the terminal in responsive to receiving the feedback signal which is sent by the terminal.

In the embodiments, the operation that the information is sent to the terminal in responsive to receiving the feedback signal may include: in a case where the received feedback signal is a first indication signal, data information is sent to the terminal over a PDSCH, wherein the first indication signal is used for indicating that the terminal successfully decodes the control information sent by the base station to the terminal over the PDCCH. The first indication signal may be an indication signal sent by the terminal over a PUCCH, or may be an indication signal sent by the terminal over a PUSCH.

In the embodiments, the operation that the data information is sent to the terminal over the PDSCH in the case where the feedback signal is the first indication signal may further include: in a case where a third indication signal is received, the control information is sent to the terminal over the PDCCH, wherein the third indication signal is a signal indicating that the terminal fails to decode the data information which is sent, in responsive to receiving the first indication signal sent by the terminal, to the terminal over the PDSCH.

In the embodiments, a preset time is set for the process that the base station receives the feedback signal from the terminal, the time unit of the preset time may be milliseconds (ms), slot, symbol, etc., but is not limited to the foregoing time units, and may be defined by the base station according to situations. In a case where the first indication signal sent by the terminal is received within the preset time, the base station sends the data information to the terminal over the PDSCH. In a case where the first indication signal sent by the terminal is not received within the preset time, the base station resends the control information to the terminal over the PDCCH.

In the embodiments, the operation that the information is sent to the terminal in responsive to receiving the feedback signal sent by the terminal may further include: the control information is sent to the terminal over the PDCCH in a case where the feedback signal is a second indication signal, wherein the second indication signal is a signal indicating that the terminal decodes the control information unsuccessfully; and in a case where no signal is received, the control information is sent to the terminal over the PDCCH.

In the embodiments, in responsive to receiving the second indication signal or the third indication signal sent by the terminal within the first preset time, or in responsive to receiving no signal within the first preset time, the base station immediately schedules the control information previously sent to the terminal, and resends the control information to the terminal over the PDCCH.

In the embodiments, in responsive to receiving the second indication signal or the third indication signal sent by the terminal within the first preset time, or in responsive to receiving no signal within the first preset time, the base station may resend the control information to the terminal over the PDCCH after the second preset time.

According to the method for transmitting data provided in the embodiments of the present disclosure, the base station sends control information to the terminal on a PDCCH, starts to receive a feedback signal which is sent by the terminal after decoding the control information, and sends information to the terminal after receiving the feedback signal. Some implementations can avoid the problems of low speed in rescheduling resources and having a time delay caused by the fact that the network side needs to wait for the terminal to decode control information sent over a control channel, receive and decode data information, and send a feedback signal, before the network side can reschedule control information resources. The embodiments of the present disclosure can realize, but not limited to, accelerating the speed of retransmission of resources, reducing the data transmission delay, and making the transmission more reliable.

According to the method for transmitting data in the embodiments of the present disclosure, a base station can retransmit resources more quickly, thus reducing the time delay of data transmission. For ease of understanding, the method for transmitting data in the embodiments of the present disclosure is described below with reference to an application scenario.

Figure 4:
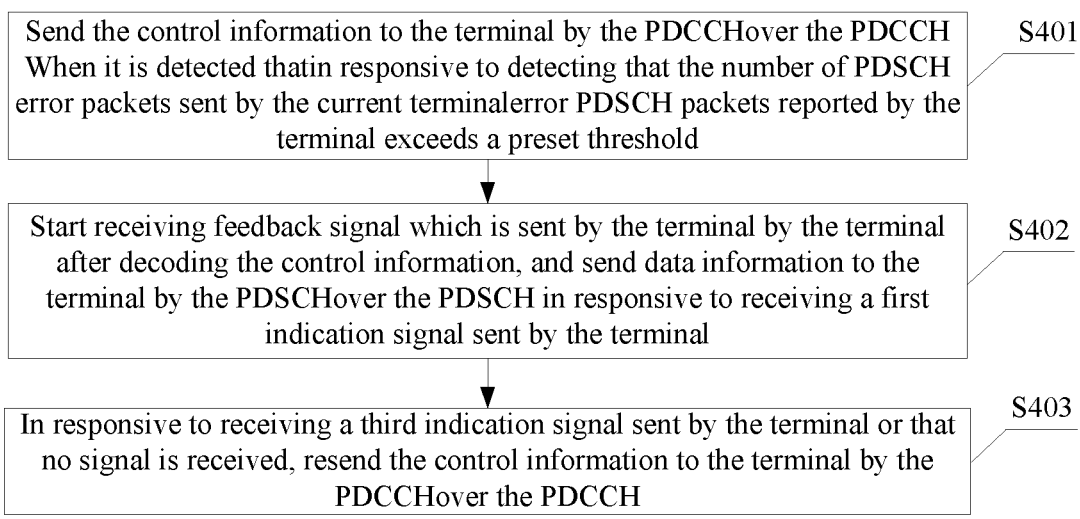
FIG. 4 is a detailed flowchart of a method for transmitting data according to some embodiments of the present disclosure.

FIG. 4 is a basic flowchart of a method for transmitting data provided by some exemplary embodiments of the present disclosure. The method includes operations S401 to S403 as follows.

In operation S401, in responsive to detecting that the number of error PDSCH packets reported by a terminal exceeds a preset threshold, control information is sent to the terminal over a PDCCH.

In the embodiments, in a case where the base station detects that the number of error PDSCH packets reported by the terminal exceeds 5% of the total number of data packets sent by the base station to the terminal over the PDSCH, the base station sends an indication signal to instruct the terminal to feed back, after receiving the control information over the PDCCH, a decoding result of the control information, and then sends the control information to the terminal over the PDCCH.

In operation S402, the base station starts to receive feedback signal which is sent by the terminal after decoding the control information, and in responsive to receiving a first indication signal sent by the terminal, data information is sent to the terminal over a PDSCH.

In the embodiments, the first indication signal is a signal (ACK signal) indicating successful decoding of the control information by the terminal. In responsive to receiving a first indication signal sent by the terminal over the PUCCH, the base station sends data information to the terminal over the PDSCH, wherein the data information may include a plurality of data packets.

In operation S403, in responsive to receiving a third indication signal sent by the terminal or that no signal is received, the control information is resent to the terminal over the PDCCH.

In the embodiments, the third indication signal is a NACK signal, sent over the PDSCH, indicating that the terminal fails to decode PDSCH data information which is sent by the base station after receiving the first indication signal. In the embodiments, the case where the base station does not receive the feedback signal refers to that the base station receives no data after sending the control information over the PDCCH.

In the embodiments, the base station may also be configured to resend the control information to the terminal over the PDCCH in responsive to receiving no signal within the first preset time or receiving a third indication signal sent by the terminal.

According to the method for transmitting data provided in the embodiments of the present disclosure, in responsive to detecting that the number of error PDSCH packets reported by the terminal exceeds a preset threshold, a base station sends control information to the terminal over the PDCCH; in responsive to receiving a first indication signal sent by the terminal, the base station sends one or more data packets to the terminal over the PDSCH; and in response to receiving no signal or receiving a signal indicating that the terminal decodes the one or more data packets unsuccessfully, the base station resends the control information to the terminal over the PDCCH. The embodiments of the present disclosure avoid the problems that the base station has a low speed in rescheduling resources and has a time delay in a case where the terminal decodes the control information unsuccessfully or misses detecting the control information. The embodiments of the present disclosure accelerate the speed of retransmission of resources, reduce the time delay of data transmission, and transmit data more reliably.

According to the method for transmitting data in the embodiments of the present disclosure, a base station can retransmit resources more quickly, thus reducing the time delay of data transmission. For ease of understanding, the method for transmitting data in the embodiments of the present disclosure is described below with reference to an application scenario.

Figure 5:
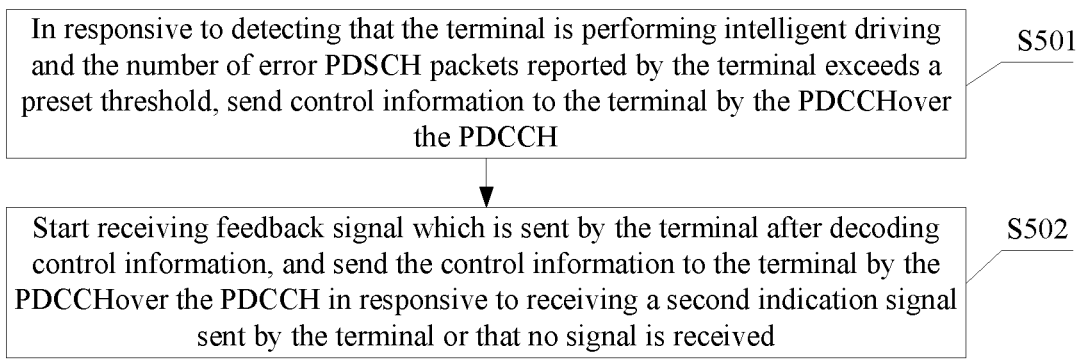
FIG. 5 is another detailed flowchart of a method for transmitting data according to some other embodiments of the present disclosure.

FIG. 5 is another detailed flowchart of a method for transmitting data according to some other exemplary embodiments of the present disclosure. The method includes operations S501 to S502 as follows.

In operation S501, in responsive to detecting that a terminal is performing intelligent driving and the number of error PDSCH packets reported by the terminal exceeds a preset threshold, control information is sent to the terminal over a PDCCH.

In the embodiments, in a case where the base station detects that the terminal is performing intelligent driving and the number of error PDSCH packets reported by the terminal exceeds 2% of the total number of data packets sent by the base station to the terminal, the base station sends an indication signal to instruct the terminal to feed back, after receiving the control information over the PDCCH, a decoding result of the control information, and then sends the control information to the terminal over the PDCCH.

In operation S502, the base station starts to receive feedback signal which is sent by the terminal after decoding control information, and in responsive to receiving a second indication signal sent by the terminal or that no signal is received, the control information is sent to the terminal over the PDCCH.

In the embodiments, the second indication signal is a signal (NACK signal) indicating unsuccessful decoding of the control information by the terminal, in a case where the base station receives no signal within a first preset time or receives the second indication signal sent by the terminal over the PUCCH, after a second preset time, the base station reschedules and resends the control information, which is missed to be detected or incorrectly decoded by the terminal before, sent over the PDCCH, and then sends the control information to the terminal.

According to the method for transmitting data provided in the embodiments of the present disclosure, in a case where a base station first detects that the terminal is performing intelligent driving and the number of error PDSCH packets reported by the terminal exceeds a preset threshold, control information is sent to the terminal over a PDCCH; and in a case where the base station receives no signal or receives the second indication signal sent by the terminal, the base station reschedules and resends the control information, which is missed to be detected or incorrectly decoded by the terminal before, sent over the PDCCH, and then sends the control information to the terminal. The embodiments of the present disclosure avoid the problems that the base station has a low speed in rescheduling resources and has a time delay caused by the fact that the network side needs to wait for the terminal to decode control information sent over a control channel, receive and decode data information, and send a feedback signal, before the network side can reschedule control information resources. The embodiments of the present disclosure accelerate the speed of retransmission of resources, greatly improve the stability of critical services at the coverage edge of 5G signals, reduce the time delay of data transmission, and transmit data more reliably.

In order to solve the problems of low speed in rescheduling resources and having a time delay caused by the fact that the network side needs to wait for the terminal to decode control information sent over a control channel, receive and decode data information, and send a feedback signal, before the network side can reschedule control information resources, the embodiments of the present disclosure provide a method for transmitting data, and the method for transmitting data proposed in the present disclosure is described below with reference to embodiments.

Figure 6:
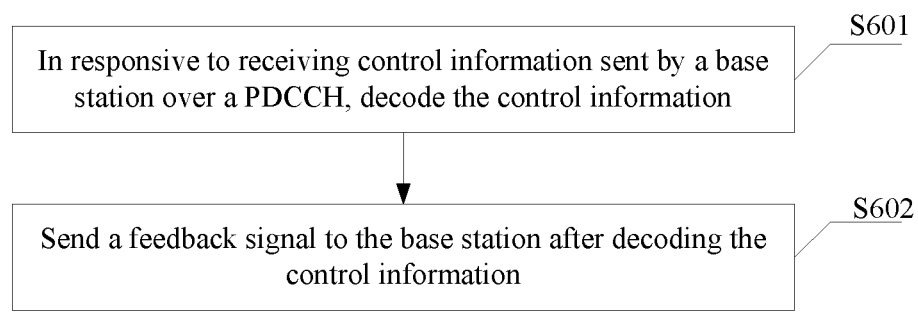
FIG. 6 is a basic flowchart of a method for transmitting data according to some embodiments of the present disclosure.

Please refer to FIG. 6, FIG. 6 is a basic flowchart of a method for transmitting data provided by some exemplary embodiments of the present disclosure. The method includes operations S601 to S602 as follows.

In operation S601, in responsive to receiving control information sent by a base station over a PDCCH, the control information is decoded.

In the embodiments, the terminal may be an industrial Customer Premise Equipment (CPE) product, an industrial control robot, an intelligent driving vehicle terminal, a mobile phone, a tablet, an unmanned aerial vehicle, an AR/VR headset, a medical device, an intelligent home, an intelligent watch, an intelligent detection device, etc. In the embodiments, in responsive to receiving the control information sent by the base station over the PDCCH, the terminal decodes the control information. The operation of decoding the control information may further include: decoding the control information within a third preset time.

In operation S602, the feedback signal is sent to the base station after the control information is decoded.

In the embodiments, after decoding the control information, the method may further include: detecting whether the terminal decodes the control information successfully, wherein in responsive to detecting that the terminal decodes the control information successfully, a first indication signal is sent to the base station, and the first indication signal may be an ACK signal which is sent by the terminal over a PUCCH or a PUSCH. Then, the terminal decodes data information sent by the base station over the PDSCH.

In the embodiments, after the terminal decodes the data information sent by the base station over the PDSCH, the method may further include: detecting whether the terminal decodes the data information successfully. In the embodiments, in a case where the terminal decodes the data information unsuccessfully, the terminal sends a third indication signal to the base station, wherein the third indication signal is briefly referred to as a NACK signal. In the embodiments, in a case where the terminal decodes the data information unsuccessfully, the terminal may send the NACK signal over a PUCCH or a PUSCH. After the terminal sends the third indication signal to the base station, operation S601 is executed. In the embodiments, a fourth indication signal is sent to the base station in a case where the terminal successfully decodes the data information sent over the PDSCH. The fourth indication signal may be an ACK signal which is sent by the terminal over a PUCCH or a PUSCH.

In the embodiments, the terminal sends the second indication signal to the base station in a case of decoding the control information sent over the PDCCH unsuccessfully. The second indication signal may be a NACK signal which is sent by the terminal over a PUCCH or a PUSCH. After the terminal sends the second indication signal to the base station, operation S601 is executed.

According to the method for transmitting data provided in the embodiments of the present disclosure, a terminal receives control information sent by a base station over a PDCCH, and then decodes the control information. In a case of decoding the control information successfully, the terminal sends to the base station an ACK signal indicating successful decoding, then the terminal then receives data information sent by the base station over the PDSCH, and decodes the data information sent over the PDSCH. In a case of decoding the control information unsuccessfully, the terminal sends to the base station a NACK signal indicating unsuccessful decoding, and receives the control information resent by the base station over the PDCCH. In a case where the terminal decodes the control information unsuccessfully, the terminal sends to the base station a NACK signal indicating unsuccessful decoding, and receives the control information resent by the base station over the PDCCH, until the terminal decodes the data information successfully. The embodiments of the present disclosure avoid the problems of low speed and having a time delay caused by the fact that the network side needs to wait for the terminal to decode control information sent over a control channel, receive and decode data information, and send a feedback signal, before the network side can reschedule control information resources. The embodiments of the present disclosure accelerate the speed of retransmission of resources, greatly improve the stability of critical services at the coverage edge of 5G signals, reduce the time delay of data transmission, and transmit data more reliably. The implementation is low in complexity, and the implementation cost of the terminal is not obviously increased.

According to the method for transmitting data in the embodiments of the present disclosure, a base station can retransmit resources more quickly, thus reducing the time delay of data transmission. For ease of understanding, the method for transmitting data in the embodiments of the present disclosure is described below with reference to an application scenario.

Figure 7:
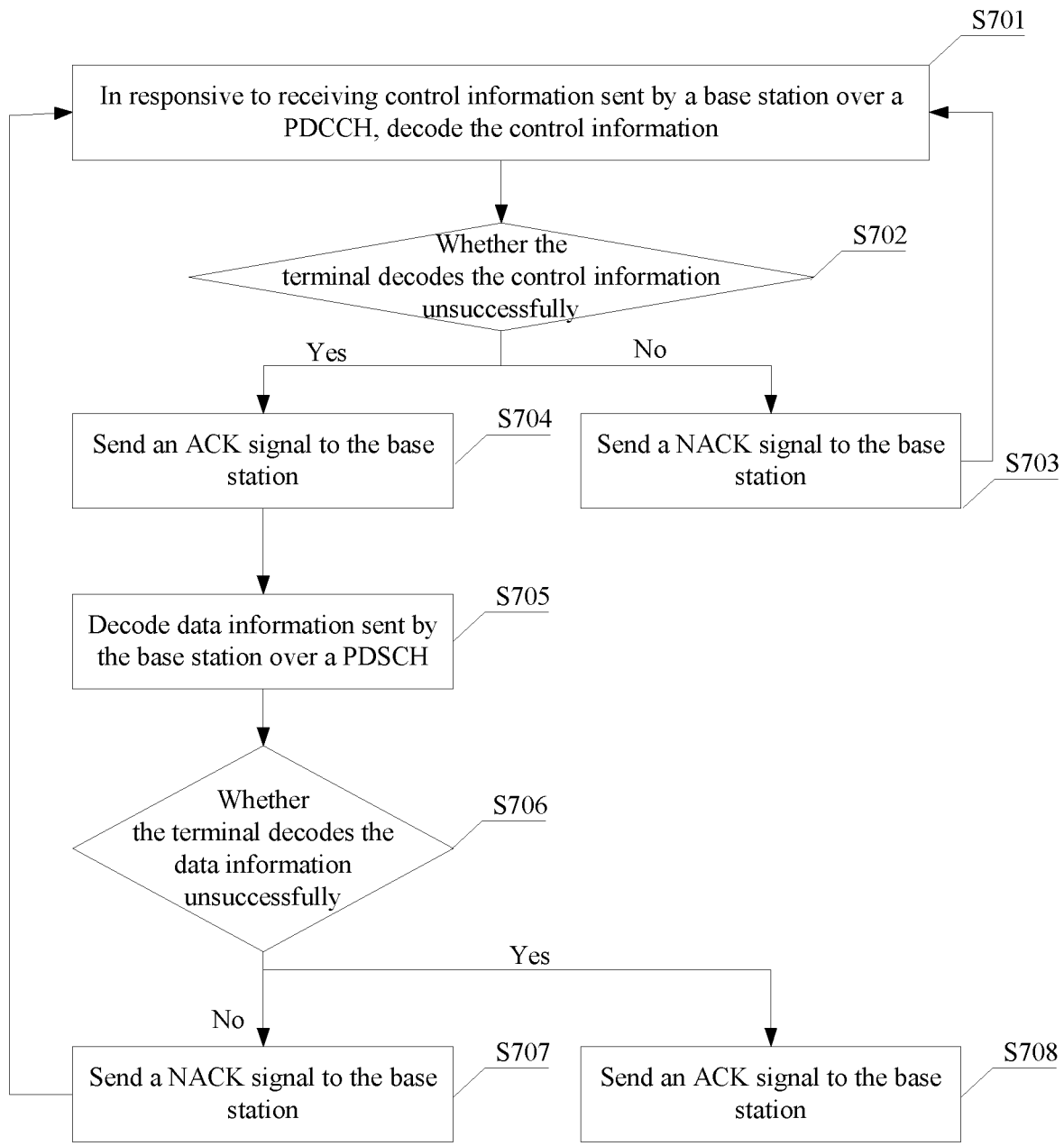
FIG. 7 is a detailed flowchart of a method for transmitting data according to some embodiments of the present disclosure.

FIG. 7 is a detailed flowchart of a method for transmitting data according to some embodiments of the present disclosure, and the method includes operations S701 to S708 as follows.

In operation S701, in responsive to receiving control information sent by a base station over a PDCCH, the control information is decoded.

In the embodiments, the terminal is a terminal mounted on an intelligent driving vehicle. Upon receipt of the control information sent by the base station over the PDCCH, the terminal decodes the control information within a third preset time.

In operation S702, it is detected whether the terminal decodes the control information unsuccessfully.

In the embodiments, in a case where the terminal decodes the control information unsuccessfully, operation S703 is executed. In a case where the terminal decodes the control information successfully, operation S704 is executed.

In operation S703, a NACK signal indicating that the control information is decoded unsuccessfully is sent to the base station.

In the embodiments, in a case where the terminal decodes the control information unsuccessfully, the terminal sends a NACK signal to the base station over a PUSCH, and then operation S701 is executed.

In operation S704, an ACK signal is sent to the base station.

In the embodiments, in a case where the terminal decodes the control information successfully, the terminal sends an ACK signal to the base station over a PUCCH.

In operation S705, data information sent by the base station over a PDSCH is received, and the data information is decoded.

In the embodiments, the terminal receives data information sent by the base station over the PDSCH, and decodes the data information.

In operation S706, it is detected whether the terminal decodes the data information unsuccessfully.

In the embodiments, in a case where the terminal decodes the data information unsuccessfully, operation S707 is executed. In a case where the terminal decodes the data information successfully, operation S708 is executed.

In operation S707, a NACK signal is sent to the base station.

In the embodiments, after the terminal sends the NACK signal to the base station over the PUSCH, operation S701 is executed.

In operation S708, an ACK signal indicating that the data information is decoded successfully is sent to the base station.

In the embodiments, the terminal sends an ACK signal to the base station over a PUCCH.

According to the method for transmitting data provided in the embodiments of the present disclosure, a terminal receives control information sent by a base station over a PDCCH, then decodes the control information. In a case of decoding the control information successfully, the terminal sends to the base station an ACK signal indicating successful decoding, the terminal then receives data information sent by the base station over the PDSCH, and decodes the data information sent over the PDSCH. In a case of decoding the control information unsuccessfully, the terminal sends to the base station an NACK signal indicating unsuccessful decoding, and receives the control information resent by the base station over the PDCCH. In a case where the terminal decodes the control information unsuccessfully, the terminal sends to the base station an NACK signal indicating unsuccessful decoding, and receives the control information resent by the base station over the PDCCH, until the terminal decodes the data information successfully. The embodiments of the present disclosure avoid the problems of low speed and having a time delay caused by the fact that in a case where a terminal decodes control information unsuccessfully or misses detecting the control information, the network side needs to wait for the terminal to send, after the base stations sends data information to the terminal over a PDSCH, a feedback signal indicating unsuccessful decoding or missed detection of the data information sent over the PDSCH before the base station can reschedule resources and data. The embodiments of the present disclosure accelerate the speed of retransmission of resources, greatly improve the stability of critical services at the coverage edge of 5G signals, reduce the time delay of data transmission, and transmit data more reliably. The implementation is low in complexity, and the implementation cost of the terminal is not obviously increased.

Figure 8:
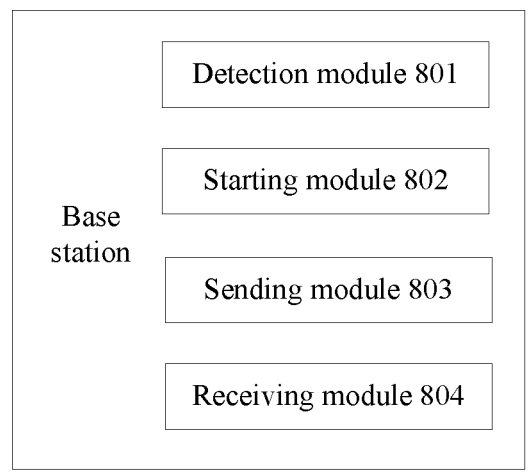
FIG. 8 is a schematic diagram of the composition of a base station according to some embodiments of the present disclosure.

Some embodiments of the present disclosure provide a base station. Refer to FIG. 8, FIG. 8 is a schematic diagram of the composition of a base station according to some exemplary embodiments of the present disclosure. The base station includes: a detecting module 801, a starting module 802, a sending module 803, and a receiving module 804. The detection module 801 is configured to detect error PDSCH packets reported by a terminal and an application scenario of the terminal; the starting module 802 is configured to start to receive a feedback signal which is sent by the terminal after decoding control information; the sending module 803 is configured to send the control information to the terminal over a PDCCH in a case where the number of the error PDSCH packets reported by the terminal exceeds a preset threshold, and send information to the terminal according to the feedback signal; and the receiving module 804 is configured to receive the feedback signal which is sent by the terminal.

According to the base station provided in the embodiments of the present disclosure, in a case where a base station detects that an ongoing application of the terminal is a preset application or detects that the number of error PDSCH packets reported by the terminal exceeds a preset threshold, the base station sends control information to the terminal over a PDCCH, starts to receive a feedback signal which is sent by the terminal after decoding the control information, and sends information to the terminal after receiving the feedback signal. The embodiments of the present disclosure avoid the problems of having a low speed in rescheduling resource data and having a time delay caused by the fact that the network side needs to wait for the terminal to decode control information sent over a control channel, receive and decode data information, and send a feedback signal, before the network side can reschedule control information resources. The embodiments of the present disclosure accelerate the speed of transmission of resources, greatly improve the stability of critical services at the coverage edge of 5G signals, reduce the time delay of data transmission, and transmit data more reliably.

Figure 9:
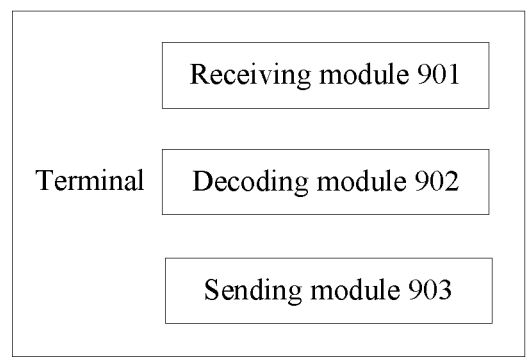
FIG. 9 is a schematic diagram of the composition of a terminal according to some embodiments of the present disclosure.

Some embodiments of the present disclosure provide a terminal. Refer to FIG. 9, FIG. 9 is a schematic diagram of the composition of a terminal provided by some exemplary embodiments of the present disclosure. The terminal includes: a receiving module 901, a decoding module 902 and a sending module 903, wherein the receiving module 901 is configured to receive control information sent by a base station over a PDCCH; the decoding module 902 is configured to decode the control information; and the sending module 903 is configured to send a feedback signal to the base station after the decoding module decodes the control information.

According to the terminal provided in the embodiment of the present disclosure, a terminal receives control information sent by a base station over a PDCCH, decodes the control information sent over the PDCCH, and then sends a feedback signal to the base station. The embodiments of the present disclosure avoid the problems of low speed and having a time delay caused by the fact that the network side needs to wait for the terminal to decode control information sent over a control channel, receive and decode data information, and send a feedback signal, before the network side can reschedule control information resources. The embodiments of the present disclosure accelerate the speed of retransmission of resources, greatly improve the stability of critical services at the coverage edge of 5G signals, reduce the time delay of data transmission, and transmit data more reliably. The implementation is low in complexity, and the implementation cost of the terminal is not obviously increased.

Figure 10:
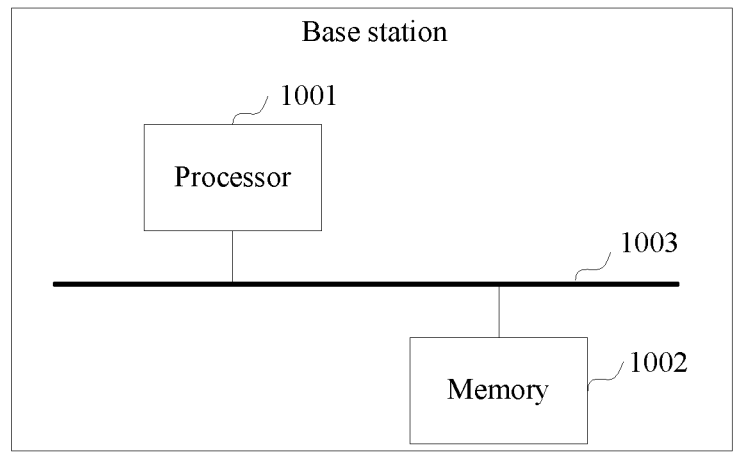
FIG. 10 is a schematic structural diagram of a base station according to some embodiments of the present disclosure.

Some embodiments of the present disclosure provide a base station. As shown in FIG. 10, the base station includes: a processor 1001, a memory 1002, and a communication bus 1003. The communication bus 1003 is configured to implement connection and communication between the processor 1001 and the memory 1002. The processor 1001 is configured to execute one or more computer programs stored in the memory 1002, so as to implement any method for transmitting data in the embodiments.

The embodiments provide a computer-readable storage medium, and the computer-readable storage medium includes volatile and nonvolatile, removable and non-removable media implemented in any method or technology for storage of information such as computer-readable instructions, data structures, program modules or other data. The computer-readable storage medium includes, but is not limited to, random access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette, magnetic tape, magnetic disk storage or other magnetic storage devices, or any other medium that can be used to store desired information and that can be accessed by a computer.

The computer-readable storage medium in the embodiments may be configured to store one or more computer programs, and the one or more computer programs stored in the computer-readable storage medium may be executed by a processor, so as to implement the method for transmitting data in any one of the foregoing embodiments.

In the embodiments of the present disclosure, a base station sends control information to a terminal over a PDCCH. After receiving a feedback signal which is sent by the terminal after decoding the control information, the base station can resend the information data to the terminal. The embodiments of the present disclosure avoid the problems of having a low speed in rescheduling resource data and having a time delay caused by the fact that the network side needs to wait for the terminal to decode control information sent over a control channel, receive and decode data information, and send a feedback signal, before the network side can reschedule control information resources. The embodiments of the present disclosure accelerate the speed of retransmission of resources, greatly improve the stability of critical services at the coverage edge of 5G signals, reduce the time delay of data transmission, and transmit data more reliably.

Figure 11:
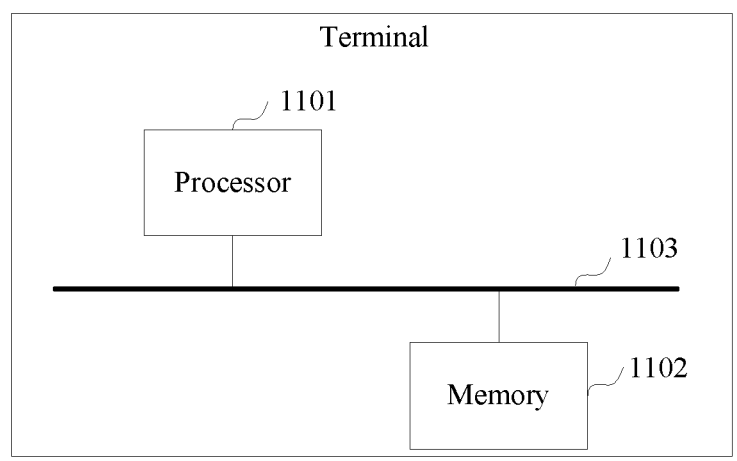
FIG. 11 is a schematic structural diagram of a terminal according to some embodiments of the present disclosure.

Some embodiments of the present disclosure provide a terminal. Refer to the schematic structural diagram of the terminal shown in FIG. 11. The terminal includes: a processor 1101, a memory 1102 and a communication bus 1103, wherein the communication bus 1103 is configured to implement connection and communication between the processor 1101 and the memory 1102; and the processor 1101 is configured to execute one or more computer programs stored in the memory 1102, so as to implement the method for transmitting data in the described embodiment.

The embodiments provide a computer-readable storage medium, and the computer-readable storage medium includes volatile and nonvolatile, removable and non-removable media implemented in any method or technology for storage of information such as computer-readable instructions, data structures, program modules or other data. The computer-readable storage medium includes, but is not limited to, random access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette, magnetic tape, magnetic disk storage or other magnetic storage devices, or any other medium that can be used to store desired information and that can be accessed by a computer.

The computer-readable storage medium in the embodiments may be configured to store one or more computer programs, and the one or more computer programs stored in the computer-readable storage medium may be executed by a processor, so as to implement the method for transmitting data in the foregoing embodiment.

According to the embodiments of the present disclosure, a terminal receives control information sent by a base station over a PDCCH, decodes the control information sent over the PDCCH, and then sends a feedback signal to the base station. The embodiments of the present disclosure avoid the problems of low speed and having a time delay caused by the fact that the network side needs to wait for the terminal to decode control information sent over a control channel, receive and decode data information, and send a feedback signal, before the network side can reschedule control information resources. The embodiments of the present disclosure accelerate the speed of retransmission of resources, greatly improve the stability of critical services at the coverage edge of 5G signals, reduce the time delay of data transmission, and transmit data more reliably. The implementation is low in complexity, and the implementation cost of the terminal is not obviously increased.

In order to solve the problems of low speed and having a time delay caused by the fact that the network side needs to wait for the terminal to decode control information sent over a control channel, receive and decode data information, and send a feedback signal, before the network side can reschedule control information resources, the embodiments of the present disclosure provide a method for transmitting data, and the method for transmitting data proposed in the present disclosure is described below with reference to embodiments.

Figure 12:
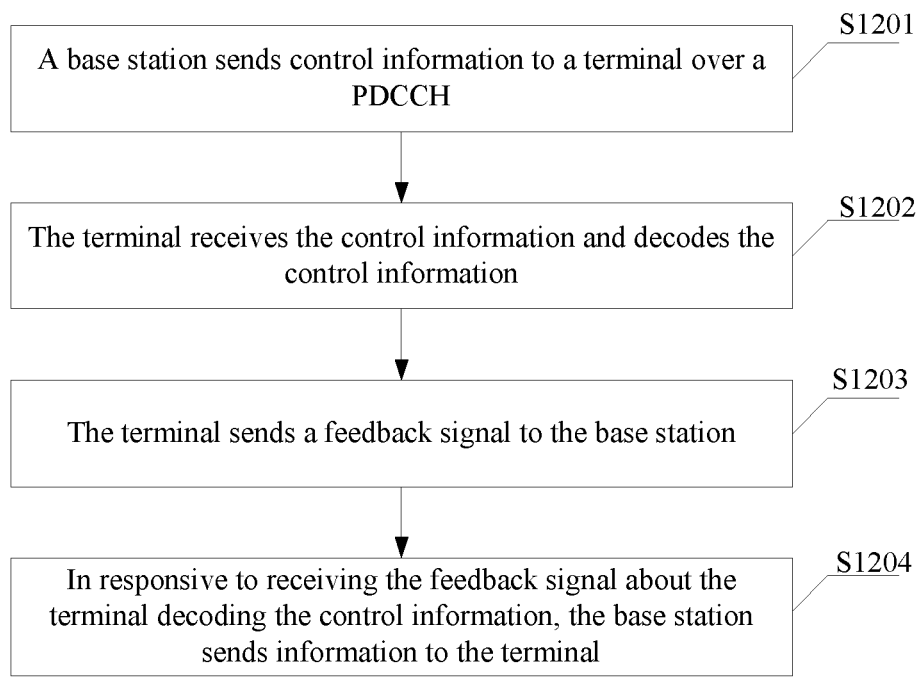
FIG. 12 is a flowchart of a method for transmitting data according to some embodiments of the present disclosure.

Please refer to FIG. 12, FIG. 12 is a flowchart of a method for transmitting data provided by some exemplary embodiments of the present disclosure. The method for transmitting data includes operations S1201 to S1204 as follows.

In operation S1201, a base station sends control information to a terminal over a PDCCH.

In the embodiments, before the control information is sent to the terminal over the PDCCH, the method may further include at least one of the following: in responsive to detecting that the number of error PDSCH packets reported by the terminal exceeds a preset threshold, sending the control information to the terminal over the PDCCH; and in responsive to detecting that an application scenario of the terminal is a preset application scenario, sending the control information to the terminal over the PDCCH. The application scenario of the terminal includes, e.g., intelligent driving, unmanned driving, intelligent medical treatment, industrial control robot, aerospace control, etc.

In operation S1202, the terminal receives the control information and decodes the control information.

In the embodiments, the terminal receives the control information and decodes the control information in a following manner: the terminal decodes the control information within a third preset time after the terminal receives the control information.

In operation S1203, the terminal sends a feedback signal to the base station.

In the embodiments, the feedback signal may be sent to the base station over a PUSCH or a PUCCH.

In the embodiments, in a case where the terminal decodes the control information successfully, the terminal sends a first indication signal to the base station, and then the terminal decodes data information sent by the base station over a PDSCH. After the terminal decodes the data information sent by the base station over the PDSCH, the method may further include: in a case where the terminal decodes the data information unsuccessfully, the terminal sends a third indication signal to the base station, wherein the third indication signal is briefly referred to as a NACK signal.

In the embodiments, in a case of decoding the control information unsuccessfully, the terminal sends a second indication signal to the base station, wherein the second indication signal is a NACK signal.

In operation S1204, in responsive to receiving the feedback signal about the terminal decoding the control information, the base station sends information to the terminal.

In the embodiments, in a case where the base station does not receive the feedback signal about the terminal decoding the control information, the base station sends the control information to the terminal.

In the embodiments, in a case where the feedback signal which is sent by the terminal and received by the base station is the first indication signal, the base station sends data information to the terminal over a PDSCH. The data information may be sent to the terminal over the PDSCH within a preset time, wherein the data information includes a plurality of data packets.

In the embodiments, after the base station receives the second indication signal or the third indication signal sent by the terminal, the base station reschedules the control information previously sent to the terminal over the PDCCH, and resends the control information, and operation S1201 is executed.

According to the method for transmitting data provided in the embodiments of the present disclosure, control information is sent by a base station over a PDCCH, the terminal receives the control information and decodes the control information, and in a case of decoding the control information successfully, sends an ACK signal to the base station; the base station reschedules the control information sent to the terminal over the PDCCH, the terminal receives the control information and decodes the control information, and in a case of decoding the control information successfully, sends an ACK signal to the base station; the base station sends data information to the terminal over the PDSCH, and the terminal decodes the data information; the terminal sends a NACK signal to the base station in a case of decoding the data information unsuccessfully, and sends an ACK signal to the base station in a case of decoding the data information successfully. The base station reschedules the control information previously sent to the terminal in a case of receiving no signal or receiving a NACK signal. The embodiments of the present disclosure avoid the problems of having a low speed and having a time delay caused by the fact that the network side needs to wait for the terminal to decode control information sent over a control channel, receive and decode data information, and send a feedback signal, before the network side can reschedule control information resources. The embodiments of the present disclosure accelerate the speed of retransmission of resources, greatly improve the stability of critical services at the coverage edge of 5G signals, reduce the time delay of data transmission, and transmit data more reliably. The implementation is low in complexity, and the implementation cost of the terminal is not obviously increased.

Some embodiments of the present disclosure provide a communication system. The communication system includes a base station and a terminal. The base station includes: a detection module, a starting module, a receiving module and a sending module, wherein the detection module is configured to detect error PDSCH packets reported by the terminal and an application scenario of the terminal; the starting module is configured to start to receive a feedback signal which is sent by the terminal after decoding control information; the sending module is configured to send the control information to the terminal over a PDCCH in a case where the number of the error PDSCH packets reported by the terminal exceeds a preset threshold, and send information to the terminal according to the feedback signal; and the receiving module is configured to receive the feedback signal from the terminal.

The terminal includes: a receiving module, a decoding module and a sending module, wherein the receiving module is configured to receive control information sent by the base station over the PDCCH; the decoding module is configured to decode the control information; and the sending module is configured to send the feedback signal to the base station after the decoding module decodes the control information.

Some embodiments of the present disclosure provide a communication system. In a case where a base station detects that an ongoing application of the terminal is a preset application or detects that the number of error PDSCH packets reported by the terminal exceeds a preset threshold, the base station sends control information over a PDCCH. The terminal receives the control information and decodes the control information, and sends a feedback signal to the base station after decoding the control information. After receiving the feedback signal about the terminal decoding the control information, the base station can reschedule the control information from the terminal or send data information to the terminal. The embodiments of the present disclosure accelerate the speed of retransmission of resources, greatly improve the stability of critical services at the coverage edge of 5G signals, reduce the time delay of data transmission, and transmit data more reliably. The implementation is low in complexity, and the implementation cost of the terminal is not obviously increased.

The beneficial effects of the embodiments of the present disclosure are as follows: according to the method for transmitting data, the base station, the terminal, the system, and the computer-readable storage medium provided in the embodiments of the present disclosure, a base station sends control information to the terminal over a PDCCH, starts to receive a feedback signal which is sent by the terminal after decoding the control information, and sends information to the terminal after receiving the feedback signal. The embodiments of the present disclosure avoid the problems of having a low speed in rescheduling resources and having a time delay caused by the fact that the network side needs to wait for the terminal to decode control information sent over a control channel, receive and decode data information, and send a feedback signal, before the network side can reschedule control information resources. The technical effects include, but are not limited to, accelerating the speed of retransmission of resources, reducing the transmission data delay, and making the transmission more reliable.

Hence, those having ordinary skill in the art should understand that all or some of the operations in the method disclosed above and the functional modules/units in the systems and devices disclosed above may be implemented as software (which may be implemented by using executable program codes of the computing devices), firmware, hardware and appropriate combinations thereof. In a hardware implementation, the division between functional modules/units referred to in the above description does not necessarily correspond to the division of physical components. For example, a physical component may have multiple functions, or one function or operation may be cooperatively performed by several physical components. Some or all of the physical components may be implemented as software executed by a processor, such as a central processor, a digital signal processor, or a microprocessor, or may be implemented as hardware or an integrated circuit, such as an application specific integrated circuit.

In addition, those having ordinary skill in the art should know that a communication medium generally contains computer-readable instructions, data structures, computer program modules, or other data in a modulated data signal such as a carrier wave or other transport mechanisms, and may include any information delivery media. Hence, the present disclosure is not limited to any particular combination of hardware and software.

The content above are further detailed description of some embodiments of the present disclosure with reference to exemplary embodiments, and it cannot be determined that the exemplary implementation of the present disclosure is only limited to these descriptions. For those having ordinary skill in the art of the present disclosure, several simple deduction or alternation can also be made without departing from the conception of the present disclosure, and these should be considered to fall within the scope of the present disclosure.

What is claimed is:

1. A method for transmitting data performed by a base station, the method comprising:
    sending control information to a terminal over a Physical Downlink Control Channel (PDCCH);
    starting to receive a feedback signal which is sent by the terminal after decoding the control information; and
    sending information to the terminal in responsive to receiving the feedback signal, wherein sending the information to the terminal in responsive to receiving the feedback signal comprises: in a case where the feedback signal is a first indication signal, sending data information to the terminal over a Physical Downlink Shared Channel (PDSCH), wherein the first indication signal is a signal indicating that the terminal decodes the control information successfully.

2. The method for transmitting data according to claim 1, wherein sending the control information to the terminal over the PDCCH comprises at least one of the following:
    in responsive to detecting that the number of error Physical Downlink Shared Channel (PDSCH) packets reported by the terminal exceeds a preset threshold, sending the control information to the terminal over the PDCCH; and
    in responsive to detecting that an application scenario of the terminal is a preset application scenario, sending the control information to the terminal over the PDCCH.

3. The method for transmitting data according to claim 1, wherein sending the information to the terminal in responsive to receiving the feedback signal further comprises: in a case where the feedback signal is a second indication signal or no signal is received, sending the control information to the terminal over the PDCCH, wherein the second indication signal is a signal indicating that the terminal decodes the control information unsuccessfully.

4. The method according to claim 3, wherein in a case where the feedback signal is a second indication signal or no signal is received, sending the control information to the terminal over the PDCCH comprises:
    in responsive to receiving the second indication signal sent by the terminal within a first preset time, or in responsive to receiving no signal within a first preset time, immediately scheduling the control information previously sent to the terminal and resending the control information to the terminal over the PDCCH.

5. The method according to claim 3, wherein in a case where the feedback signal is a second indication signal or no signal is received, sending the control information to the terminal over the PDCCH comprises:
    in responsive to receiving the second indication signal sent by the terminal within a first preset time, or in responsive to receiving no signal within a first preset time, resending the control information to the terminal over the PDCCH after a second preset time.

6. The method for transmitting data according to claim 1, wherein sending the data information to the terminal over the PDSCH in the case where the feedback signal is the first indication signal further comprises: in a case of receiving a third indication signal, sending the control information to the terminal over the PDCCH, wherein the third indication signal is a signal indicating that the terminal fails to decode the data information which is sent, in responsive to receiving the first indication signal sent by the terminal, to the terminal over the PDSCH.

7. The method according to claim 6, wherein in a case of receiving a third indication signal, sending the control information to the terminal over the PDCCH comprises:
in responsive to receiving the third indication signal sent by the terminal within a first preset time, immediately scheduling the control information previously sent to the terminal and resending the control information to the terminal over the PDCCH.

8. The method according to claim 6, wherein in a case of receiving a third indication signal, sending the control information to the terminal over the PDCCH comprises:
in responsive to receiving the third indication signal sent by the terminal within a first preset time, resending the control information to the terminal over the PDCCH after a second preset time.

9. The method for transmitting data according to claim 1, wherein the feedback signal is a signal sent by the terminal over a Physical Uplink Control Channel (PUCCH) or a Physical Uplink Shared Channel (PUSCH).

10. A method for transmitting data performed by a terminal, the method comprising:
in responsive to receiving control information sent by a base station over a Physical Downlink Control Channel (PDCCH), decoding the control information; and
sending a feedback signal to the base station after decoding the control information, wherein sending the feedback signal to the base station after decoding the control information comprises: sending a first indication signal to the base station in a case of decoding the control information successfully, so as to trigger the base station to send data information to the terminal over a Physical Downlink Shared Channel (PDSCH) in response to receiving the first indication signal.

11. The method for transmitting data according to claim 10, wherein sending the feedback signal to the base station after decoding the control information further comprises: sending a second indication signal to the base station in a case of decoding the control information unsuccessfully.

12. The method for transmitting data according to claim 10, wherein sending the first indication signal to the base station in the case of decoding the control information successfully further comprises: decoding data information sent by the base station over a Physical Downlink Shared Channel (PDSCH), and sending a third indication signal to the base station in a case of decoding the data information unsuccessfully.

13. The method for transmitting data according to claim 10, wherein sending the feedback signal to the base station after decoding the control information comprises: sending the feedback signal to the base station over a Physical Uplink Control Channel (PUCCH) or a Physical Uplink Shared Channel (PUSCH) after decoding the control information.

14. A base station, comprising: a processor, a memory and a communication bus, wherein
the communication bus is configured to implement connection and communication between the processor and the memory; and
the processor is configured to execute one or more computer programs stored in the memory, so as to implement the method for transmitting data according to claim 1.

15. A terminal, comprising: a processor, a memory and a communication bus, wherein
the communication bus is configured to implement connection and communication between the processor and the memory; and
the processor is configured to execute one or more computer programs stored in the memory, so as to implement the method for transmitting data according to claim 10.

16. A method for transmitting data, comprising:
sending, by a base station, control information to a terminal over a Physical Downlink Control Channel (PDCCH);
decoding, by the terminal, the control information, and sending, by the terminal, a feedback signal to the base station after decoding the control information, wherein sending the feedback signal to the base station after decoding the control information comprises: sending a first indication signal to the base station in a case of decoding the control information successfully, wherein the first indication signal is a signal indicating that the terminal decodes the control information successfully; and
sending, by the base station, information to the terminal in responsive to receiving the feedback signal, wherein sending the information to the terminal in responsive to receiving the feedback signal comprises: in a case where the feedback signal is the first indication signal, sending data information to the terminal over a Physical Downlink Shared Channel (PDSCH).

17. A communication system, comprising: a base station and a terminal, wherein the base station comprises a first processor, a first memory and a first communication bus; and the terminal comprises a second processor, a second memory and a second communication bus;
the first communication bus is configured to implement connection and communication between the first processor and the first memory;
the second communication bus is configured to implement connection and communication between the second processor and the second memory;
the first processor and the second processor are configured to execute one or more computer programs stored in the first memory and the second memory respectively, so as to implement the method for transmitting data according to claim 16.

18. A non-transitory computer-readable storage medium, wherein the non-transitory computer-readable storage medium stores one or more computer programs, and the one or more computer programs, when being executed by one or more processors, cause the processor to implement the method for transmitting data according to claim 1.

19. A non-transitory computer-readable storage medium, wherein the non-transitory computer-readable storage medium stores one or more computer programs, and the one or more computer programs, when being executed by one or more processors, cause the processor to implement the method for transmitting data according to claim 10.

* * * * *